United States Patent
Catherman et al.

(10) Patent No.: US 7,581,097 B2
(45) Date of Patent: Aug. 25, 2009

(54) APPARATUS, SYSTEM, AND METHOD FOR SECURE COMMUNICATIONS FROM A HUMAN INTERFACE DEVICE

(75) Inventors: Ryan Charles Catherman, Raleigh, NC (US); Dave Carroll Challener, Raleigh, NC (US); Akira Hino, Sagamihara (JP); James Patrick Hoff, Raleigh, NC (US); James Peter Ward, Apex, NC (US)

(73) Assignee: Lenovo Pte Ltd, Singapore (SG)

( * ) Notice: Subject to any disclaimer, the term of this patent is extended or adjusted under 35 U.S.C. 154(b) by 855 days.

(21) Appl. No.: 10/745,172

(22) Filed: Dec. 23, 2003

(65) Prior Publication Data

US 2005/0138434 A1    Jun. 23, 2005

(51) Int. Cl.
*H04L 9/00* (2006.01)

(52) U.S. Cl. ..................................... 713/168

(58) Field of Classification Search .................. 726/5, 726/73, 4, 27; 713/189, 165, 167, 164, 168, 713/169–171, 176, 180–182; 705/73
See application file for complete search history.

(56) References Cited

U.S. PATENT DOCUMENTS

| | | | | |
|---|---|---|---|---|
| 4,797,920 A | * | 1/1989 | Stein | 705/72 |
| 5,517,569 A | * | 5/1996 | Clark | 380/52 |
| 5,809,143 A | * | 9/1998 | Hughes | 705/77 |
| 5,822,435 A | * | 10/1998 | Boebert et al. | 713/192 |
| 5,917,168 A | * | 6/1999 | Nakamura et al. | 235/379 |
| 7,225,331 B1 | * | 5/2007 | McBrearty et al. | 713/158 |
| 7,243,237 B2 | * | 7/2007 | Peinado et al. | 713/181 |
| 2002/0080974 A1 | | 6/2002 | Grawrock | 380/282 |
| 2002/0083328 A1 | * | 6/2002 | Riordan | 713/183 |
| 2002/0120575 A1 | | 8/2002 | Pearson et al. | 705/51 |
| 2003/0046593 A1 | * | 3/2003 | Xie et al. | 713/202 |
| 2003/0191716 A1 | * | 10/2003 | Woods et al. | 705/50 |
| 2004/0218762 A1 | * | 11/2004 | Le Saint et al. | 380/277 |
| 2005/0066186 A1 | * | 3/2005 | Gentle et al. | 713/193 |

* cited by examiner

*Primary Examiner*—Beemnet W Dada
(74) *Attorney, Agent, or Firm*—Kunzler & McKenzie (57) ABSTRACT

An apparatus, system and method of secure communications from a human interface device are provided. The apparatus, system, and method receive input data and calculate encrypted data from the input data using a secure credential. In one embodiment the apparatus, system, and method request and receive a single instance credential and calculate the encrypted data using the secure credential and the single instance credential. The encrypted data may be a secure authorization that may be valid for one use. Communication of the encrypted data through networks and communicating devices is secure. The encrypted data may not be decrypted even if intercepted without the secure credential. The apparatus, system, and method enable secure communications from the human interface device.

17 Claims, 5 Drawing Sheets

(Prior Art)

APPARATUS, SYSTEM, AND METHOD FOR SECURE COMMUNICATIONS FROM A HUMAN INTERFACE DEVICE

BACKGROUND OF THE INVENTION

1. Field of the Invention

This invention relates to secure communications and more particularly relates to secure communications from a human interface device.

2. Description of the Related Art

The users of data processing devices regularly send sensitive data such as passwords, account numbers, credit card numbers, and personal identification numbers to other data processing devices. Data processing devices may include computers, servers, mainframes, networks, network devices, routers, personal digital assistants, and telephones.

Sensitive data can be intercepted when communicated between data processing devices, compromising the security of the sensitive data and any accounts, information, and resources that the sensitive data may protect. To secure sensitive data from being compromised if intercepted, sensitive data is often communicated as encrypted data.

Users frequently input sensitive data into the data processing device using a human interface device ("HID"). HIDs include keyboards, touch screens, entry tablets, computer mice, trackballs, styluses, microphones, scanners, and cameras. An HID may also include identification devices such as card readers, fingerprint scanners, retinal scanners, and physical key ports.

Figure 1:
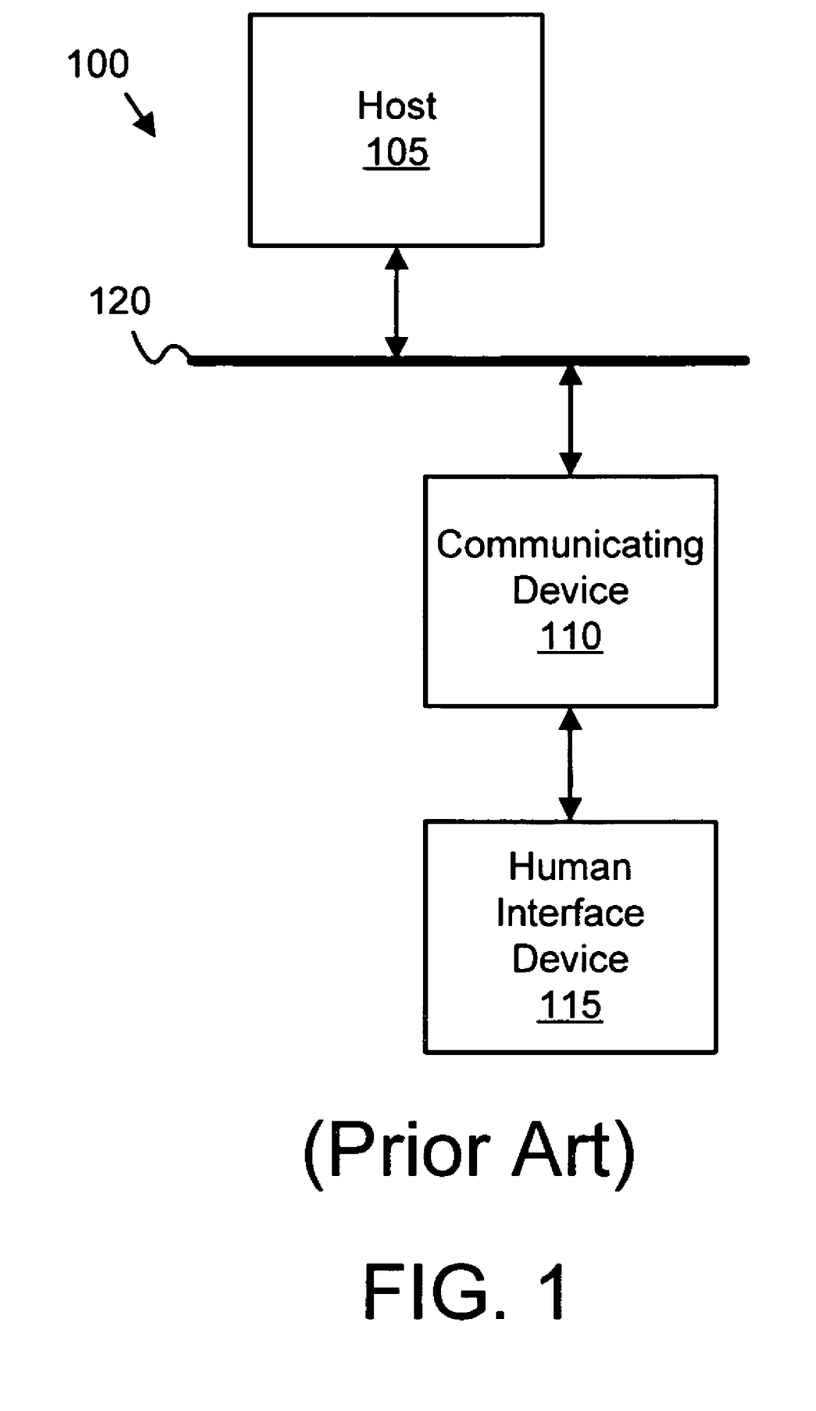
FIG. 1 is a block diagram illustrating a conventional input data encryption system.

FIG. 1 illustrates a conventional input data encryption system 100. The sensitive data encryption system 100 communicates input data such as sensitive data from a HID 115 to a host 105. The input data encryption system 100 includes a host 105, a communicating device 110, a HID 115, and a network 120.

A user enters input data such as a password into the HID 115. The HID 115 communicates the input data to the communicating device 110. The communicating device 110 is typically a data processing device such as a computer. The communicating device 110 encrypts the input data as encrypted data. In addition, the communicating device 110 communicates the encrypted data to the host 105. The host 105 is typically a data processing device such as a server. The host 105 may decrypt the encrypted data to access the input data.

Unfortunately, the input data entered into the HID 115 is not encrypted as the input data is communicated from the HID 115 to the communicating device 110. The input data may be intercepted when communicated from the HID 115 in an unencrypted form, putting the input data at risk. For example, the keystrokes of a keyboard HID 115 may be recorded by a snooping program placed on the communicating device 110 without the knowledge of the user. If the user communicated input data such as a password to the host 105 through the communicating device 110, the snooping program could intercept the unencrypted password although the password is subsequently encrypted by the communicating device 110 for communication to the host 105.

To further protect sensitive data, data processing standards groups such as the Trusted Computing Platform Alliance ("TCPA") and the Trusted Computing Group ("TCG") have created specifications for establishing a trusted relationship between data processing devices. Data processing devices with a trusted relationship share a secure credential such as a random number. The data processing devices may communicate securely using encrypted data. The encrypted data is encrypted and decrypted with the secure credential possessed by the data processing devices in the trusted relationship.

For example, a first data processing device with a trusted relationship with a second data processing device may be configured to calculate encrypted data using a secure credential. The first data processing device then communicates the encrypted data to the second data processing device. The second data processing device also posses the secure credential and decrypts the encrypted data using the secure credential. Unfortunately, HIDs 115 do not support trusted relationships and cannot communicate sensitive data as encrypted data. Thus, sensitive data communicated from a HID 115 to a data processing device may be intercepted before the sensitive data can be encrypted.

Consequently, a need exists for a process, apparatus, and system for secure communications from a HID 115. What is further needed is a process, apparatus, and system for establishing a trusted relationship with the HID 115. Beneficially, such a process, apparatus, and system would enable the user to communicate input data from the HID 115 as encrypted data, protecting the sensitive data from unauthorized access if the encrypted data is intercepted after communication from the HID 115.

SUMMARY OF THE INVENTION

The present invention has been developed in response to the present state of the art, and in particular, in response to the problems and needs in the art that have not yet been fully solved by currently available human interface device ("HID") secure communication apparatus, systems, and methods. Accordingly, the present invention has been developed to provide a process, apparatus, and system for secure communications from HIDs that overcome many or all of the above-discussed shortcomings in the art.

The apparatus for secure HID communications is provided with a logic unit containing a plurality of modules configured to functionally execute the necessary steps of receiving input data and calculating encrypted data. These modules in the described embodiments include a communications module, an input/output ("I/O") module, and an encryption module.

I/O module, in one embodiment, is configured to receive input data. The encryption module calculates encrypted data from the input data using a secure credential. The secure credential is a shared secret. In one embodiment, the input data is encrypted with a hash coding function.

The encryption module is further configured, in one embodiment, to calculate encrypted data from the input data when the apparatus is in a trusted state. In an alternate embodiment, the encryption module may calculate encrypted data from all input data. The apparatus may enter the trusted state upon receipt of a secure session packet. In one embodiment, the secure session packet is an authorization digest as specified by the Trusted Computer Group ("TCG"). In an alternate embodiment, the secure session packet is an authorization digest as specified by the Trusted Computing Platform Alliance ("TCPA").

In one embodiment, the encryption module receives a single instance credential. The single instance credential may be a nonce and may be included in a secure session packet. The encryption module may have requested the single instance credential. In a certain embodiment, the encryption module calculates the encrypted data from the input data using the secure credential and the single instance credential.

In another aspect of the present invention, an apparatus for secure communications with a HID is presented. The apparatus includes a host communication module and a host encryption module. The host communication module receives encrypted data from the HID. The encrypted data is encrypted using a secure credential. The host encryption module decrypts the encrypted data using the secure credential.

In one embodiment, the apparatus includes a secure credential module. The secure credential module may create the secure credential. In one embodiment, the secure credential module is a TCG Software Stack ("TSS"). In a certain embodiment, the secure credential module communicates the secure credential to the HID.

In one embodiment, the secure credential module creates a single instance credential. The host communication module may communicate the single instance credential to the HID. The HID may calculate the encrypted data using the single instance credential and the secure credential. The host encryption module decrypts the encrypted data using the single instance credential and the secure credential.

A system of the present invention is also presented for secure communications between a HID and a host device. The system may be embodied in a data processing system. In particular, the system, in one embodiment, includes a host device and a HID. The HID receives input data from a user and calculates encrypted data from the input data using a secure credential. In addition, the HID communicates the encrypted data to the host device. In one embodiment, the HID calculates encrypted data from the input data and the secure credential in a trusted state. The host device may communicate a secure session packet to the HID to initiate the trusted state.

In one embodiment, the system includes a communicating device. The HID communicates the encrypted data to the host device through the communicating device. In one embodiment, the communicating device passes the encrypted data to the host device without altering the encrypted data. In a certain embodiment, the communicating device does not possess the secure credential and cannot decrypt the encrypted data. The communicating device may not have a trusted relationship with the HID and the host device.

In an alternate embodiment, the communicating device receives a single instance credential from the host device. The single instance credential may be a nonce. The single instance credential may be received in a secure session packet. In a certain embodiment, the communicating device receives encrypted data from the HID and reencrypts the encrypted data using the single instance credential. In an alternate embodiment, the communicating device receives the input data and the secure credential from the HID and calculates the encrypted data from the input data using the secure credential and the single instance credential. The communicating device may have a trusted relationship with the HID and the host device. In one embodiment, devices with a trusted relationship possess the secure credential.

In one embodiment, the host device is a data processing device. The host device receives the encrypted data from the HID. In one embodiment, the host device decrypts the encrypted data using the secure credential. The HID and the host device may have a trusted relationship. The host device may establish the trusted relationship by communicating the secure credential to the HID. In a certain embodiment, the host device decrypts the encrypted data using the secure credential and the single instance credential.

A process of the present invention is also presented for secure communications from a HID. The process in the disclosed embodiments substantially includes the steps necessary to carry out the functions presented above with respect to the operation of the described apparatus and system. In one embodiment, the process includes calculating encrypted data and communicating the encrypted data. The process also may include requesting a single instance credential and receiving the single instance credential.

The process calculates encrypted data from the input data of the HID using a secure credential. The input data may be encrypted with a hash coding function. In one embodiment, the process encrypts the input data when the HID is in a trusted state. In a certain embodiment, the process enters a trusted state by receiving a secure session packet. In one embodiment, the process requests and receives a single instance credential. The process may calculate the encrypted data from the input data using the secure credential and the single instance credential. The encrypted data may be a secure authorization such as a single use password.

The process further communicates the encrypted data. The process may decrypt the encrypted data using the secure credential. In one embodiment, the process decrypts the encrypted data using the secure credential and the single instance credential. In a certain embodiment, the process identifies the decrypted data as the secure authorization.

The present invention calculates encrypted data from HID input data using a secure credential. In addition, the present invention calculates encrypted data using the secure credential and a single instance credential. The present invention enables secure communication from the HID. The present invention may also communicate a secure authorization. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 2:
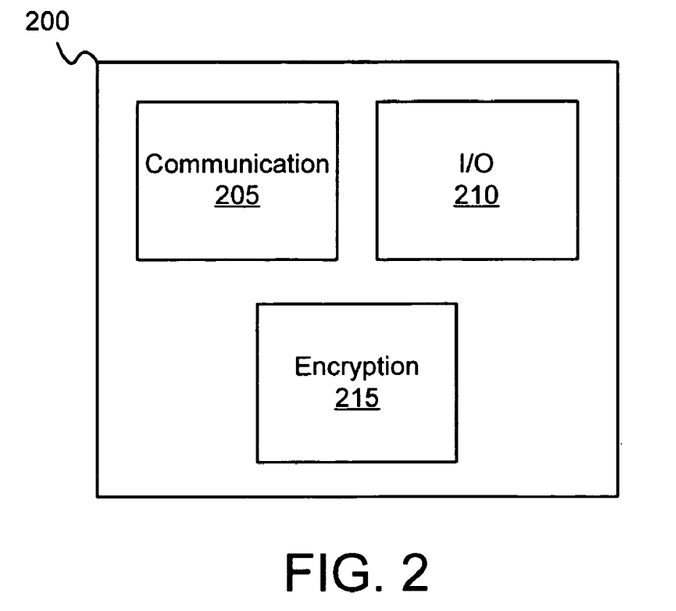
FIG. 2 is a block diagram illustrating one embodiment of a human interface device of the present invention.

FIG. 2 is a block diagram illustrating one embodiment of a human interface device ("HID") 200 of the present invention. The HID 200 calculates and communicates encrypted data. The HID 200 includes a communication module 205, an input/output ("I/O") module 210, and an encryption module 215. The HID 200 may be a keyboard, touch screen, entry tablet, computer mouse, trackball, stylus, stylus pad, microphone, scanner, telephone, and camera. The HID 200 may also be an identification device such as a card reader and a physical key port and a biometric device such as a fingerprint scanner and a retinal scanner.

The I/O module 210 receives input data. In one embodiment, a user enters the input data. For example, the user may input a password with a keyboard I/O module 210. In an alternate embodiment, the I/O module 210 may capture the input data. For example, a fingerprint scanner I/O module 210 may capture a fingerprint scan. The encryption module 215 calculates encrypted data from the input data using a secure credential. In one embodiment, the encryption module calculates the encrypted data using a hash coding function. In a certain embodiment, the hash coding function is a SHA-1 function.

In one embodiment, the encryption module 215 includes one or more modules conforming to the Trusted Building Block ("TBB") specification of the Trusted Computer Group ("TCG"). The encrypted data may be an authentication digest as specified by the TCG. In an alternate embodiment, the encryption module 215 includes a module conforming to the Trusted Platform Module ("TPM") specification of the Trusted Computing Platform Alliance ("TCPA"). The encrypted data may further be an authentication digest as specified by the TCPA.

In one embodiment the secure credential is a nonce. The nonce may be a random number, a time, and a combination of a random number and a time. In a certain embodiment, the nonce is created by a TCG Software Stack ("TSS"). In one embodiment, the secure credential is a sequence of nonces. A nonce may also be appended to the sequence of nonces to update the secure credential.

In one embodiment, the encryption module 215 calculates encrypted data from the input data when the HID 200 is in a trusted state. The encryption module 215 may activate an indicator when the HID 200 is in the trusted state. In one embodiment, the HID 200 enters the trusted state by receiving a secure session packet. The secure session packet may be an authentication digest as specified by the TCG. In an alternate embodiment, the secure session packet is an authentication digest as specified by the TCPA. The secure session packet may be decrypted using the secure credential. In a certain embodiment, the secure session packet is decrypted using keyed-hashing message authentication ("HMAC").

In one embodiment, the encryption module 215 receives a single instance credential. The single instance credential is only valid for one use and may be a nonce. In a certain embodiment, the single instance credential is included in the secure session packet. The encryption module 215 may calculate the encrypted data from the input data using the secure credential and the single instance credential.

In one embodiment, the encrypted data is a secure authorization. Because the secure authorization is calculated from both the single instance credential and the secure credential, the secure authorization may only be used successfully once. If the secure authorization is intercepted and retransmitted, the retransmitted secure authorization can be recognized as invalid.

The communication module 205 communicates the encrypted data. In one embodiment, the communication module 205 communicates the encrypted data to a host device. The encryption module 215 may receive the secure credential through the communication module 205 from the host device. In a certain embodiment, the encryption module 215 receives the single instance credential from the host device.

In one embodiment, the encryption module 215 stores one or more stored authorizations. Each stored authorization may be a password or a personal identification number for a host device. The I/O module 210 may further receive an authorization such as a password or personal identification number as input data. The encryption module 215 may receive a single instance credential from a host device. In a certain embodiment, the encryption module 215 selects the stored authorization in response to the authorization input data and the single instance credential and calculates encrypted data from the stored authorization using the secure credential and the single instance credential. The encrypted data may be a secure authorization specific to the host device that communicated the single instance credential.

For example, the I/O module 210 may receive a password from the user. If the user attempts to access a host device, the I/O module 210 receives a single instance credential from the host device. The encryption module 215 may verify that the password is valid and may select the stored authorization corresponding to the host device in response to the single instance credential. In addition, the encryption module 215 may calculate the encrypted data from the stored authorization using the secure credential and the single instance credential. In a certain embodiment, the encrypted data is a secure authorization. The user may enter one password to generate secure authorizations for one or more host devices.

In one embodiment, the communication module 205 receives encrypted data. The encryption module 215 may decrypt the encrypted data using the secure credential. The encrypted data may be decrypted using HMAC. The HID 200 calculates encrypted data from input data and communicates the encrypted data, securing the input data from unauthorized access.

Figure 3:
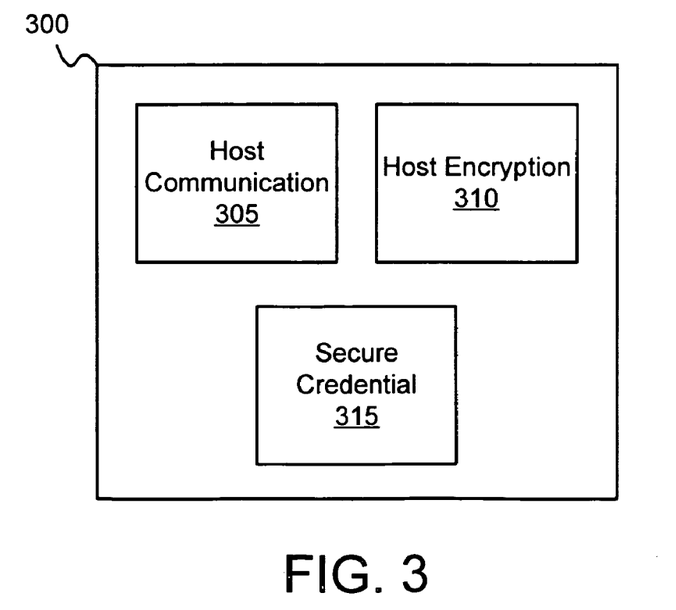
FIG. 3 is a block diagram illustrating one embodiment of a host device of the present invention.

FIG. 3 is a block diagram illustrating one embodiment of a host device 300 of the present invention. The host device 300 receives encrypted data from a HID 200 and includes a host communication module 305, a host encryption module 310, and a secure credential module 315. The host device 300 may be a data processing device such as a computer, server, personal digital assistant, telephone, router, and network.

The host encryption module 310 possesses a secure credential. The host communication module 305 receives encrypted data from the HID 200. The encrypted data is encrypted with the secure credential. In a certain embodiment, the encrypted data is an authentication digest as specified by TCG. In an alternate embodiment, the encrypted data is an authentication digest as specified by TCPA. The host encryption module 310 decrypts the encrypted data with the secure credential. In one embodiment, the host encryption module 310 decrypts the encrypted data using HMAC.

In one embodiment, the secure credential module 315 creates the secure credential. In a certain embodiment, the secure credential module 315 includes a TSS. The secure credential module 315 may communicate the secure credential to the HID 200.

In a certain embodiment, the secure credential module 315 creates a single instance credential. The host communication module 305 communicates the single instance credential to the HID 200. The HID 200 may calculate the encrypted data using the secure credential and the single instance credential. The host encryption module 310 may decrypt the encrypted data using the secure credential and the single instance credential. The encrypted data may be a secure authorization. The host device 300 receives encrypted data from the HID 200, securing communications from the HID 200 to the host device 300.

Figure 4:
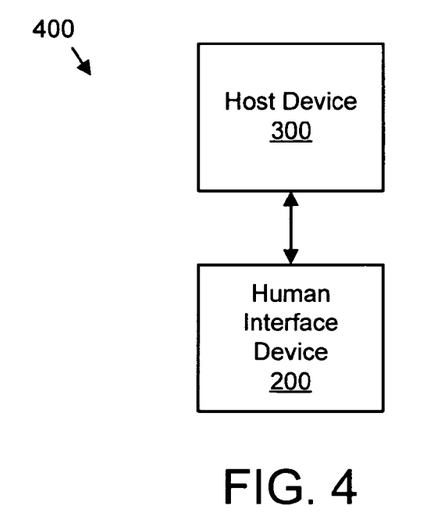
FIG. 4 is a block diagram illustrating one embodiment of a secure human interface device communications system of the present invention.

FIG. 4 is a block diagram illustrating one embodiment of a secure HID communications system 400 of the present invention. The system 400 includes a HID 200 and a host device 300. The secure HID communications system 400 encrypts input data communicated from the HID 200 to the host device 300. Although for simplicity, one HID 200 and one host device 300 are depicted, any number of HIDs 200 and any number of host device 300 may be employed.

The HID 200 calculates encrypted data from input data using a secure credential. The HID 200 communicates the encrypted data to the host device 300. The host device 300 and the HID 200 possess the secure credential. If the encrypted data is intercepted, the encrypted data may not be accessed and understood without the secure credential. The host device 300 decrypts the encrypted data using the secure credential. In one embodiment, the host device 300 communicates the secure credential to the HID 200.

In one embodiment, the host device 300 communicates a secure session packet to the HID 200. The HID 200 decrypts the secure session packet using the secure credential. In a certain embodiment, the HID 200 enters a trusted state by receiving the secure session packet from the host device 300. The HID 200 may calculate encrypted data during the trusted state.

In one embodiment, the host device 300 communicates a single instance credential to the HID 200. The single instance credential may be included in the secure session packet. The HID 200 calculates the encrypted data using the secure credential and the single instance credential. In one embodiment, the host device 300 decrypts the encrypted data using the secure credential and the single instance credential. The secure HID communications system 400 communicates input data from the HID 200 to the host device 300 as encrypted data.

Figure 5:
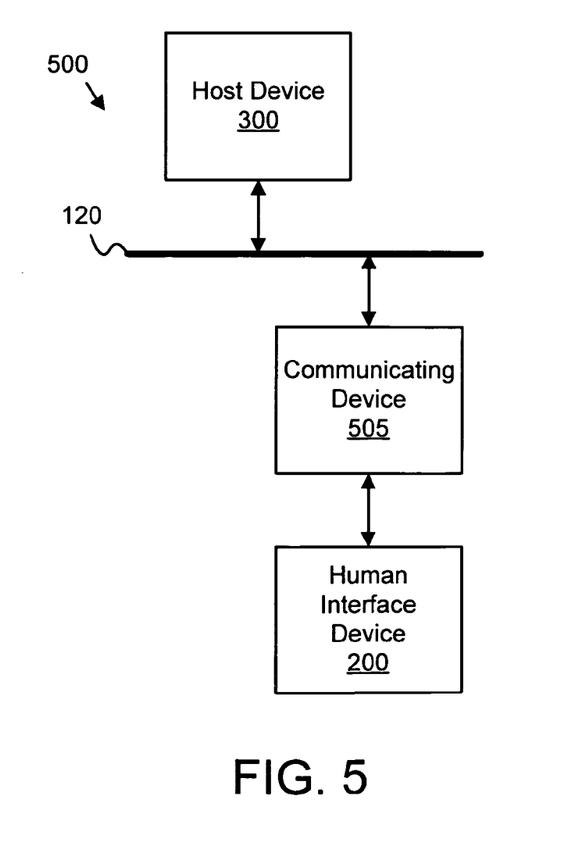
FIG. 5 is a block diagram illustrating one embodiment of a secure communications system of the present invention.

FIG. 5 is a block diagram illustrating one embodiment of a secure communications system 500 of the present invention. The secure communications system 500 communicates encrypted data between a HID 200 and a host device 300 through intervening devices. The secure communications system 500 includes a network 120, a HID 200, a host device 300, and a communicating device 505. Although for simplicity the secure communications system 500 is depicted with one network 120, one HID 200, one host device 300, and one communicating device 505, any number of networks 120, HIDs 200, host devices 300, and communicating devices 505 may be employed.

In one embodiment, the HID 200 calculates encrypted data from input data using a secure credential and communicates the encrypted data to the communicating device 505. The communicating device 505 may be a data processing device such as a computer, personal digital assistant, server, router, or network. The communicating device 505 may not posses the secure credential. In addition, the communicating device 505 and the HID 200 may not have a trusted relationship. The communicating device 505 can intercept the encrypted data, but cannot decrypt the encrypted data without the secure credential. The encrypted data may be securely communicated through the communicating device 505.

In an alternate embodiment, the communicating device 505 has access to the secure credential and may have a trusted relationship with the host device 300. The communicating device 505 may request a single instance credential from the host device 300. The host device 300 communicates the single instance credential to the communicating device 505. The single instance credential may be encrypted using the secure credential. The communicating device 505 may decrypt the single instance credential using the secure credential. In addition, the single instance credential may be included in an authorization digest.

In one embodiment, the communicating device 505 calculates the encrypted data using the secure credential and the single instance credential. The encrypted data may be a secure authorization. In a certain embodiment, the communicating device 505 receives the secure credential from the HID 200.

In an alternate embodiment, the communicating device 505 receives input data from the HID 200 and calculates the encrypted data from the input data using the secure credential and the single instance credential. In an alternate embodiment, the communicating device 505 receives encrypted data from the HID 200 and reencrypts the encrypted data using the single instance credential.

The communicating device 505 communicates the encrypted data to the host device 300. In a certain embodiment, the host device 300 receives the encrypted data from the communicating device 505 through the network 120. The host device 300 possesses the secure credential and may decrypt the encrypted data using the secure credential. In a certain embodiment, the host device 300 decrypts the encrypted data using the secure credential and the single instance credential.

In one example of the present invention, the HID 200 calculates encrypted data from input data such as a password. The HID 200 further communicates the encrypted password data to the communicating device 505. The encrypted password data is passed through the communicating device 505 and the network 120. The communicating device 505 and the network 120 do not have a trusted relationship with the HID 200 and do not possess the secure credential. If the encrypted password data is intercepted from the communicating device 505 or the network 120, the encrypted password data is secured by the encryption.

In an alternate example of the present invention, the communicating device 505 receives the single instance credential from the host device 300. The HID 200 may communicate password input data to the communicating device 505. The password input data may be communicated as encrypted data. The communicating device 505 may calculate encrypted data from the password input data using the secure credential and the single instance credential. The communicating device 505 communicates the encrypted data to the host device 300. The secure communications system 500 communicates the HID 200 input data as encrypted data between the HID 200 and the host device 300 through one or more intervening devices where the encrypted data may be intercepted.

Figure 6:
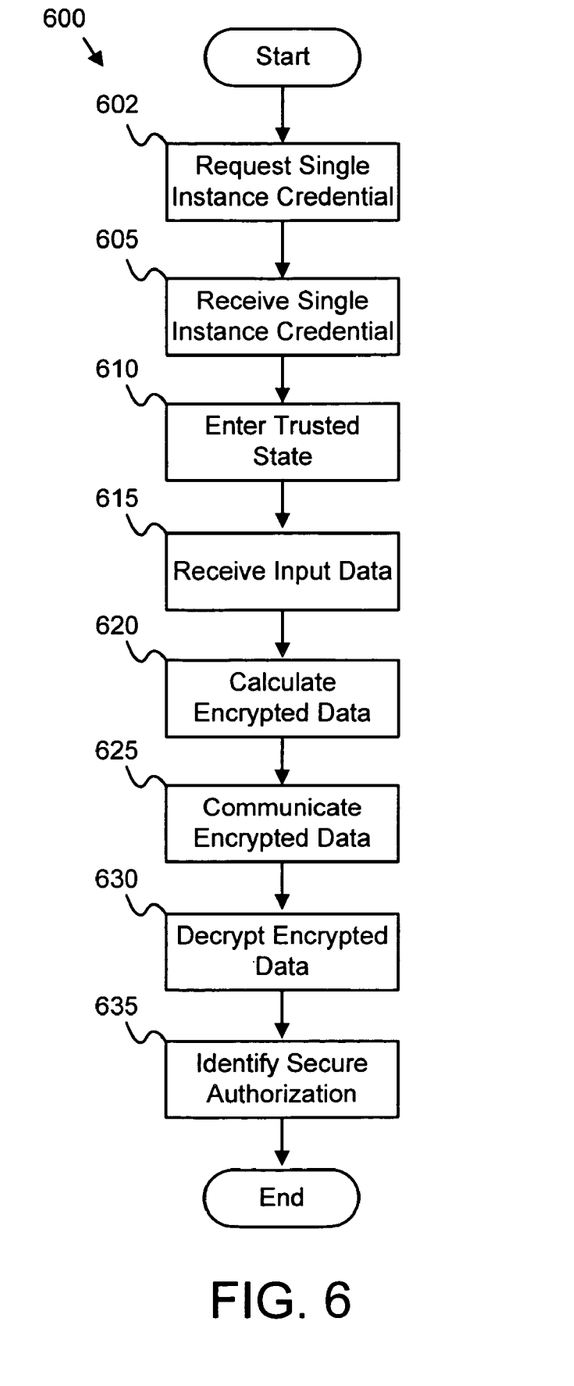
FIG. 6 is a flow chart diagram illustrating one embodiment of a secure communications process of the present invention.

FIG. 6 is a flow chart diagram illustrating one embodiment of a secure communications process 600 of the present invention. The secure communications process 600 calculates encrypted data from input data and communicates the encrypted data. Although for purposes of clarity the secure communications process 600 is depicted in a certain sequential order, execution may be conducted in parallel and not necessarily in the depicted order.

In one embodiment, the secure communications process 600 requests 602 a single instance credential. The secure communications process 600 further receives 605 the single instance credential. The single instance credential may be encrypted using a secure credential. In addition, the single instance credential may be included in a secure session packet. In one embodiment, secure session packet is an authentication digest as specified by the TCG. Alternatively, the secure session packet may be an authentication digest as specified by the TCPA.

In one embodiment, the secure communications process 600 enters 610 a trusted state. In a certain embodiment, the secure communications process 600 further receives 615 input data and calculates 620 encrypted data from the input data using the secure credential. The secure communications process 600 may also calculate 620 the encrypted data using the secure credential and the single instance credential. In one embodiment, the secure communications process 600 calculates 620 the encrypted data in the trusted state. The secure communications process 600 may calculate 620 the encrypted data using a hash coding function. In a certain embodiment, the hash coding function is a SHA-1.

The secure communications process 600 communicates 625 the encrypted data. In one embodiment, the secure communications process 600 communicates 625 the encrypted data to a host device 300. The encrypted data may further be communicated through a communicating device 505 and a network 120. If the encrypted data is intercepted, the encrypted data may not be decrypted without the secure credential.

The secure communications process 600 decrypts 630 the encrypted data using the secure credential. In one embodiment, the secure communications process 600 decrypts the encrypted data using the secure credential and the single instance credential. In a certain embodiment, the secure communications process 600 decrypts the encrypted data using HMAC. In one embodiment, encrypted data is a secure authorization. The secure communications process 600 may identify 635 the decrypted data as the secure authorization. The secure communications process 600 calculates 620 the encrypted data from the HID 200 input data and communicates 625 the encrypted data. The encrypted data is secure as it passes through one or more communicating devices 505 and one or more networks 120.

Figure 7:
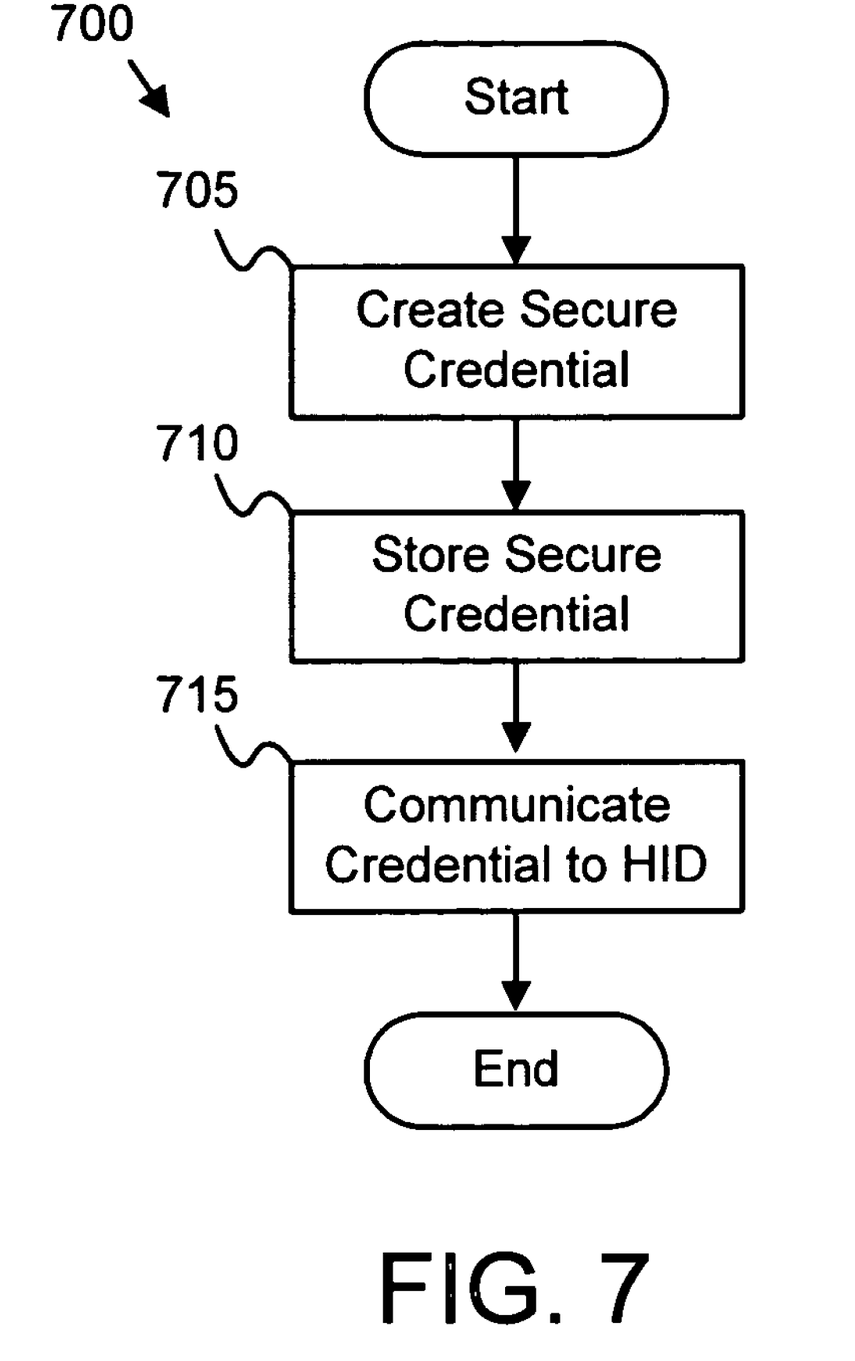
FIG. 7 is a flow chart diagram illustrating one embodiment of a secure credential distribution process in accordance with the present invention.

FIG. 7 is a flow chart diagram illustrating one embodiment of a secure credential distribution process 700 in accordance with the present invention. The secure credential distribution process 700 communicates a secure credential to a HID 200. Although for purposes of clarity the secure credential distribution process 700 is depicted in a certain sequential order, execution may be conducted in parallel and not necessarily in the depicted order.

The secure credential distribution process 700 creates 705 a secure credential. In one embodiment, the secure credential is a nonce. The secure credential may be received from a TSS. In one embodiment, the secure credential distribution process 700 stores 710 the secure credential. The secure credential distribution process 700 further communicates 715 the secure credential to the HID 200. In addition, the secure credential distribution process 700 may communicate 715 the secure credential to the communicating device 505.

In one embodiment, the secure credential is communicated 715 to the HID 200 in a secure environment. In a certain embodiment, only devices that will establish a trusted relationship with the HID 200 communicate with the HID 200 in the secure environment. The secure credential distribution process 700 creates the secure credential and communicates the secure credential to the HID 200. The secure credential distribution process 700 enables secure, encrypted communications from the HID 200.

The present invention calculates encrypted data from HID 200 input data using a secure credential. In addition, the present invention calculates encrypted data using the secure credential and a single instance credential. The present invention enables secure communication from the HID 200. The present invention may also communicate a secure authorization.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A human interface device for secure communications, the human interface device comprising:
   an encryption module comprising a storage device storing executable code executed on a processor and configured to request a single instance credential and receive the single instance credential encrypted with a secure credential in a Trusted Computing Group (TCG) authentication digest;
   an input/output module comprising the storage device storing executable code executed on the processor and configured to receive input data;
   the encryption module configured to decrypt the single instance credential using the secure credential and encrypt the input data using the secure credential and the single instance credential;
   wherein the encrypted data is a secure authorization that is valid for one use; and
   a communication module comprising a hardware circuit and configured to communicate the encrypted data.

2. The human interface device of claim 1, wherein the encryption module is configured to store a stored password and to select the stored password responsive to the authorization and the single instance credential, the encryption module further configured to encrypt the stored password using the secure credential and the single instance credential.

3. The human interface device of claim 1, further comprising an indicator configured to indicate that the encryption module is encrypting the input data.

4. An apparatus for secure communications with a human interface device, the apparatus comprising:
- a secure credential module comprising a storage device storing executable code executed on a processor and configured to create a single instance credential;
- a host communication module comprising the storage device storing executable code executed on the processor and in electrical communication with a human interface device, the host communication module configured to communicate the single instance credential encrypted with a secure credential in a TOG authentication digest from the secure credential module to the human interface device, wherein the human interface device decrypts the single instance credential using the secure credential, and receive encrypted data encrypted with the secure credential and the single instance credential from the human interface device;
- wherein the encrvDted data is a secure authorization that is valid for one use; and
- a host encryption module comprising the storage device storing executable code executed on the processor and configured to receive the encrypted data from the host communication module and to decrypt the encrypted data using the secure credential and the single instance credential.

5. A system for secure communications between a human interface device and a host device, the system comprising:
- a human interface device comprising a first storage device storing executable code executed on a first processor and configured to request a single instance credential from a host device, receive the single instance credential encrypted with a secure credential in a TOG authentication digest from the host device, decrypt the single instance credential using the secure credential, and receive input data, the human interface device further configured to encrypt the input data using the secure credential and the single instance credential and communicate the encrypted data to the host device;
- wherein the encrvDted data is a secure authorization that is valid for one use; and
- the host device comprising a second storage device storing executable code executed on a second processor, and in electrical communication with the human interface device, the host device configured to receive the encrypted data from the human interface device and to decrypt the encrypted data using the secure credential and the single instance credential.

6. A system for secure communications, the system comprising:
- a host device comprising a second storage device storing executable code executed on a second processor and possessing a secure credential, the host device further configured to communicate a single instance credential;
- a human interface device possessing the secure credential, wherein the human interface device communicates the secure credential to a communicating device, receives input data, and communicates the input data to the communicating device;
- the communicating device comprising a first storage device storing executable code executed on a first processor and configured to receive the single instance credential encrypted with the secure credential in a TOG authentication digest from the host device, receive the secure credential from the human interface device, decrypt the single instance credential using the secure credential, encrypt the input data using the secure credential and the single instance credential, wherein the encrypted data is a secure authorization that is valid for one use, and communicate the encrypted data to the host device.

7. The system of claim 6, wherein the human interface device comprises a biometric device.

8. A process for secure communications from a human interface device, the process performed by a storage device storing executable code executed by a processor and comprising:
- requesting a single instance credential;
- receiving the single instance credential encrypted with a secure credential in a TCG authentication digest;
- decrypting the single instance credential using the secure credential;
- receiving input data of a human interface device;
- encrypting the input data using the secure credential and the single instance credential;
- wherein the encrypted data is a secure authorization that is valid for one use; and
- communicating the encrypted data.

9. The process of claim 8, further comprising decrypting the encrypted data using the secure credential and the single instance credential.

10. A computer readable storage medium storing computer readable code executed by a processor and configured to carry out a process for secure communications from a human interface device, the process comprising:
- requesting a single instance credential;
- receiving the single instance credential encrypted with a secure credential in a TCG authentication digest;
- decrypting the single instance credential using the secure credential;
- receiving input data from the human interface device;
- encrypting the input data of the human interface device using the secure credential and the single instance credential;
- wherein the encrypted data is a secure authorization that is valid for one use; and
- communicating the encrypted data.

11. The computer readable storage medium of claim 10, further comprising computer readable code configured to activate an indicator responsive to encrypting input data.

12. The computer readable storage medium of claim 10, further comprising computer readable code configured to communicate the secure credential to the human interface device.

13. A computer readable storage medium storing computer readable code executed by a processor and configured to carry out a process for secure communications, the process comprising:
- receiving a secure credential;
- requesting a single instance credential;
- receiving the single instance credential encrypted with a secure credential in a TCG authentication digest;
- decrypting the single instance credential using the secure credential;
- receiving input data;
- encrypting the input data using the secure credential and the single instance credential;
- wherein the encrypted data is a secure authorization that is valid for one use; and
- communicating the encrypted data.

14. The computer readable storage medium of claim 13, further comprising computer readable code configured to decrypt the encrypted data using the secure credential and the single instance credential.

15. The computer readable storage medium of claim 14, further comprising computer readable code configured to identify the decrypted data as a secure authorization.

16. An apparatus for secure communications from a human interface device, the apparatus comprising:

means for requesting a single instance credential, the requesting means comprising a storage device storing executable code executed on a processor;

means for receiving the single instance credential encrypted with a secure credential in a TCG authentication digest, the receiving means comprising the storage device storing executable code executed on the processor;

means for calculating that decrypts the single instance credential using the secure credential and encrypts input data of a human interface device using the secure credential and the single instance credential, the calculating means comprising the storage device storing executable code executed on the processor;

wherein the encrvDted data is a secure authorization that is valid for one use; and means for communicating the encrypted data, the communicating means comprising a hardware circuit and the storage device storing executable code executed on the processor.

17. The human interface device of claim 1, wherein the encryption module calculates the encrypted data with the secure credential and the single instance credential using a SHA-1 hash coding function.

* * * * *

UNITED STATES PATENT AND TRADEMARK OFFICE
CERTIFICATE OF CORRECTION

PATENT NO. : 7,581,097 B2  Page 1 of 1
APPLICATION NO. : 10/745172
DATED : August 25, 2009
INVENTOR(S) : Catherman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1434 days.

Signed and Sealed this

Fourteenth Day of September, 2010

David J. Kappos
*Director of the United States Patent and Trademark Office*